Jan. 19, 1960     A. FRANKEL     2,921,770
FIXING OF ROTOR BLADES OF ELASTIC FLUID TURBO MACHINES
Filed Sept. 17, 1954     2 Sheets-Sheet 1
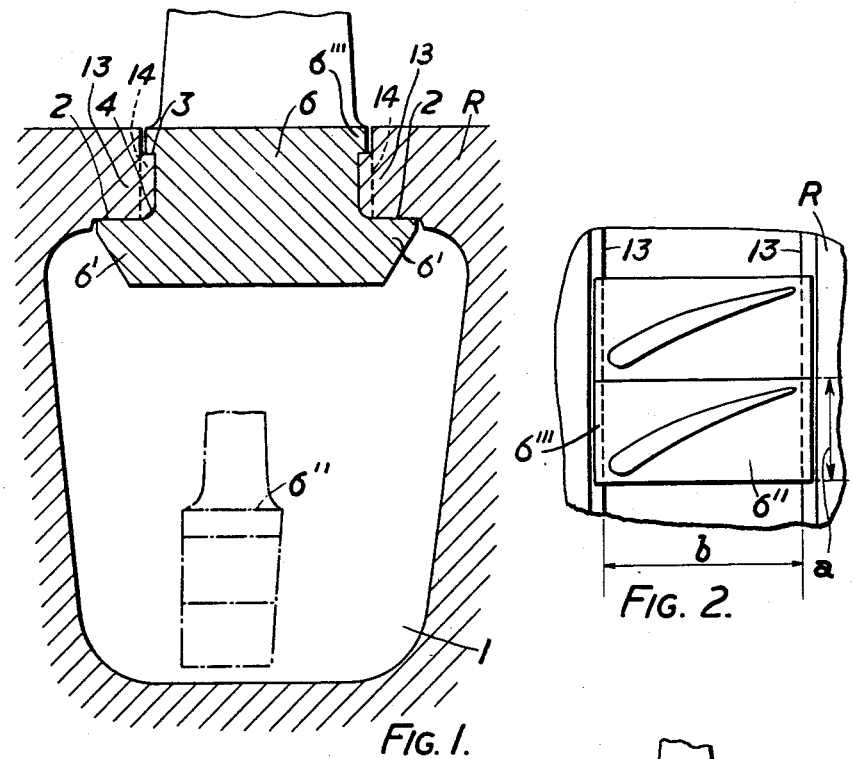
FIG. 1.
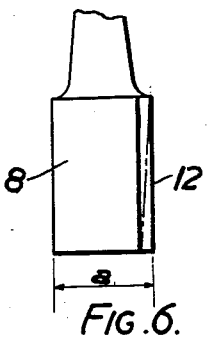
FIG. 2.
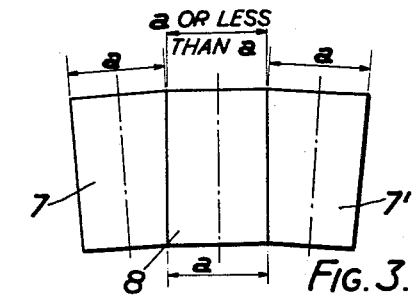
FIG. 3.
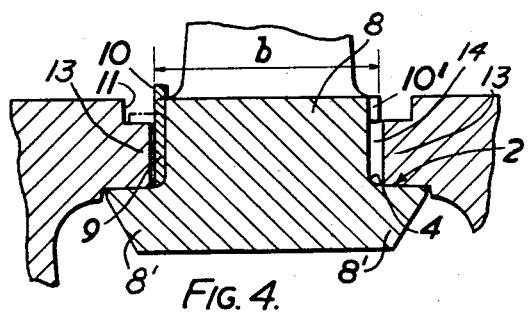
FIG. 4.
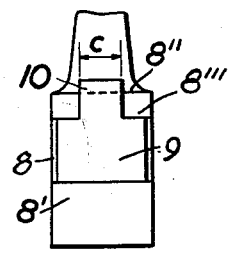
FIG. 5.
FIG. 6.

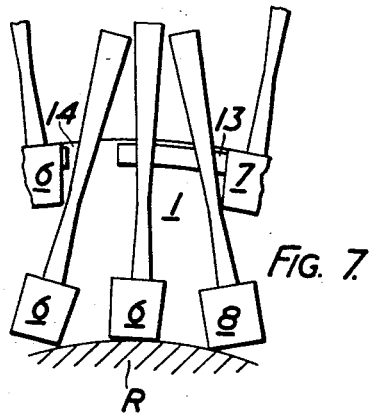
FIG. 7.
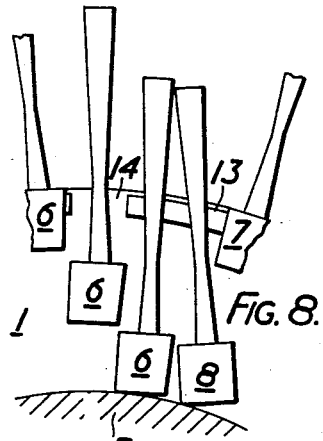
FIG. 8.
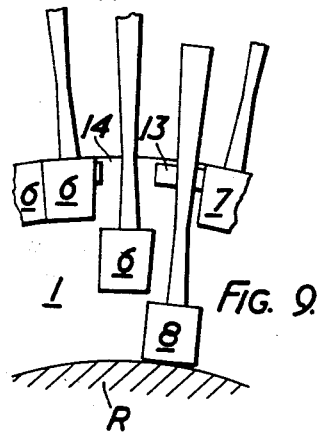
FIG. 9.
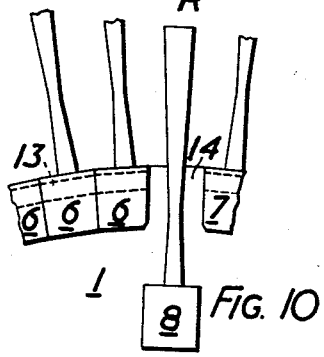
FIG. 10.
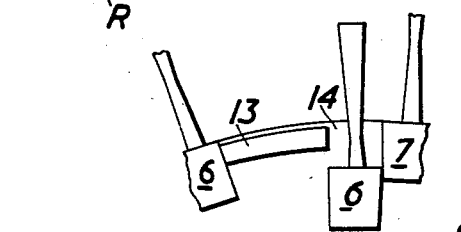
FIG. 11.
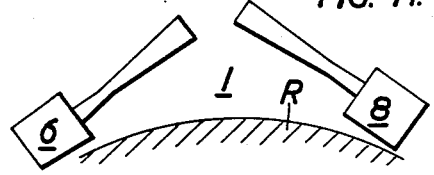

United States Patent Office 2,921,770
Patented Jan. 19, 1960

2,921,770

FIXING OF ROTOR BLADES OF ELASTIC FLUID TURBO MACHINES

Adolf Frankel, Leicester, England, assignor to The English Electric Company Limited, London, England, a British company Application September 17, 1954, Serial No. 456,765

Claims priority, application Great Britain October 2, 1953

1 Claim. (Cl. 253—77)

The invention relates to the fixing of straddle rotor blades of axial flow elastic fluid turbo machines, for example gas turbines. In this type of rotor blade fixing the problem arises of fitting the last blade (locking blade), and of closing the blade row without weakening the rotor. It is also desirable to achieve a design giving all the blades, including the locking blade, the same degree of safety and strength against centrifugal force loading.

According to the invention a circumferentially extending recess is provided for the insertion of the rotor blades which is deep enough at least partly to accommodate a rotor blade during assembly, although not necessarily in its radial position, from which recess the rotor blades are pulled up one after the other until lateral projections of their roots sections engage the said ledges in the operative position thereof in which their aerofoil portions project from the periphery of the rotor. This recess may conveniently, but not necessarily, extend under the whole periphery of the rotor.

The width of the said recess between the said ledges in the axial direction need not be larger than required for inserting the blade roots turned about their radial axis so that their minimum dimension is across the said circumferential recess; each blade is then inserted, turned about its radial axis to its operative position and pulled out radially until said lateral projections of their root sections engage said ledges of the said rotor. The width of the said recess must be large enough to permit the turning of the blade about its radial axis.

Preferably the blade platforms are also provided with a margin on each side, with which they rest during assembly and whenever the rotor is stationary or rotating too slowly for the blades to be urged outwards by centrifugal force to seat on the said lateral projections of the roots, which margins have to carry the static weight of the blade only and can accordingly be very narrow. At the place where the locking blade is to be inserted and where all the other blades are pulled radially into said circumferential groove a window is provided in that these peripheral ledges are partly machined off which can be done without reducing the area supporting the lateral projections of the root loaded by centrifugal force in operation, since the width of said margins of the blade platforms need not exceed the fillet radius of the blade root at the transition to the said projections.

The locking blade can accordingly be pulled out of the said recess while being substantially in its correct position. Preferably a washer of a deformable material is laterally attached to the blade root of the locking blade flush with the adjacent shoulder thereof, said washer having a tab which can be turned over at a right angle on assembly into a shallow axial slot in the rotor adjacent said window to hold the weight of the said locking blade, from which it is however released in operation by the centrifugal forces which may be of an order of magnitude $10^4$ higher than the static weight, and which are carried by the said inner lateral projections of the root bearing on the said circumferential ledges of the rotor from within. The carrying area of these circumferential ledges may be made the same for the locking blade as for any other blade in the row, thus affording the same safety against centrifugal force loading.

In order that the invention may be clearly understood an embodiment thereof will now be described with reference to the accompanying drawings in which:

Fig. 1 is a typical axial section through the peripheral portion of a rotor, showing part of a blade in the operative position in full lines, and in the process of assembly in chain lines.

Fig. 2 is a fragmentary plan view from outside the rotor,

Fig. 3 is a diagrammatic view on the roots on the locking blade and two adjacent blades along the axis of the rotor, Fig. 4 is a section corresponding to Fig. 1 of the root of the locking blade, Fig. 5 is a side elevation of the locking blade shown in Fig. 4 and Fig. 6 shows a modification of a locking blade in a view corresponding to Fig. 5, and Figs. 7 to 10 diagrammatically show four consecutive steps in the assembly of the last blades of a low pressure turbine stage, and Fig. 11 corresponds to Fig. 7 and applies to a high pressure turbine stage.

Referring first to Fig. 1, the rotor R is provided with a circumferentially extending recess 1 flanked on both sides by circumferentially extending ledges 13, having machined inner shoulders 2 on which projections 6' of the blade root 6 bear radially outward in operation under centrifugal loading, and narrow outer shoulders 3 of the said ledges 13 on which the blades rest with the margins 6''' of their platform 6'' on assembly or when the rotor is stationary or rotating too slowly for the blades to be urged outwards by centrifugal force to seat on the first said ledges 13. The fillet between the blade root 6 and the lateral projections 6' thereof is denoted 4, and it will be seen that its radius is approximately equal to the width of the narrow outer shoulder 3.

As will be seen in Fig. 2 the platforms 6'' of the blades are shown to be substantially rectangular, of a peripheral dimension $a$ which is smaller than the axial dimension of the blade root 6. The invention applies, however, equally well to blades with platforms having substantially a rhomboidal shape. On assembly, the blades are dropped, one after the other, into the recess 1 in a position turned 90° about their radial axis as shown in Fig. 1 in dotted lines. They are then turned 90° about their axis, pulled out through the blade window 14 described below and moved peripherally into the position shown in Fig. 1 in full lines, where they are located radially by the margins 6''' of their platforms 6'' on the shoulders 3 of the peripheral ledges 13 on the outside and by the projections 6' of their roots on the shoulders 2 of the peripheral ledges 13 on the inside.

As will be seen in Fig. 3, from which the aerofoil portions of the blades have been omitted, the locking blade has a root 8 the faces of which contacting the adjacent blade roots 7, 7', are either parallel or may even taper outwardly, the maximum peripheral dimension being equal to $a$ of Fig. 2. One or both of the adjacent blade roots 7, 7' may have their faces machined to suit the face of the locking blade root 8. This allows the locking blade to be pulled radially outward in position between the adjacent blades.

A radial slot 14 (Fig. 1) is machined into the said circumferentially extending ledges 13 on either side of the place for the root 8 of the locking blade forming a window of a depth sufficient to allow the blade root platform of a width $b$ (Figs. 2 and 4) to pass in the radial direction when pulling the locking blade up into its operative position. It will be seen from Fig. 4 that the inner shoulders 2 of the peripheral ledge 13 of the rotor which carry the centrifugal load of the blade, are left unaffected because the radius of the fillet 4 is approximately equal to the depth at which the material is here machined off.

In order to support the static weight of the locking blade on assembly or when the rotor is stationary or rotating too slowly for the blades to be urged outwards by centrifugal force to seat on the said peripheral ledges 13, slots 10′ (Fig. 4) of the peripheral dimension c are machined into the margins 8‴ of the locking blade platform 8″ to the depth sufficient to accommodate the thickness of washers 9 in locking the blade root 8, and washers 9 having tabs 10 which fit into the said slots 10′ are attached to the faces of the said root, for example by small screws (not shown). As shown in dotted lines, these tabs 10 are then turned over at a right angle into shallow axial slots 11 provided on the rotor.

Referring to Fig. 6 a standard blade having a root face parallel to its radial axis at one side, and tapering radially inward on the other side, as shown in a chain dotted line, can be converted into a locking blade (e.g. for replacement purposes) by machining off the tapering portion parallel to the other face, and fixing a shim 12 to supplement the root thickness to the dimension a of the locking blade root 8 according to Fig. 3.

Referring now to Figs. 7 to 10 the last steps in assembling the rotor blades of a low pressure stage of a multi-stage axial flow turbine are illustrated. In these stages the length of the aerofoil portions of the rotor blades is comparatively large, while the depth of the circumferentially extending recess below the roots of the rotor blades is comparatively small in a usual drum shaped rotor of a frusto-conical outer circumferential and a cylindrical inner circumference or virtual cylindrical envelope of a grooved rotor.

It is therefore not possible to drop the blades flat into the said recess 1 as in a high pressure stage as diagrammatically illustrated in Fig. 11, where the aerofoil portions of the rotor blades are comparatively short, and the said recess can be comparatively deep.

Accordingly the following procedure has to be adopted for the low pressure stages:

After all but two ordinary blades and the locking blade are assembled in the rotor, these last three blades are turned 90° and dropped from their operative position and are then turned into their operative position with their roots resting on the bottom of the recess 1 as shown in Fig. 7. The blade roots 6 of the ordinary blades have one radial face and one inclined face, the blade root 8 of the locking blade has two parallel faces, and the blade root 7 of the blade adjacent to the locking blade on the right hand side in Figs. 7 to 11 matches the adjacent face of the blade root 8 of the locking blade.

Firstly the whole blading already fitted is shifted circumferentially into a position in which the window 14 in the circumferentially extending ledges 13 supporting the lateral projections of the blade roots is in juxtaposition with the roots 6 of the ordinary blade one removed from the locking blade and the said ordinary blade is pulled into position (Fig. 8).

The whole blading is then shifted circumferentially along the circumferentially extending ledges 13 into the position of Fig. 9, where the window 14 is in juxtaposition with the last ordinary rotor blade which is then pulled up into the window 14 whereupon the whole blading is shifted circumferentially into the position of Fig. 10 where the window is in jutaxposition with the locking blade, the root 8 of which has parallel faces and can be pulled in between the root 6 of the last ordinary blade on its left and the root 7 of the adapted blade on its right. The locking blade is then secured by turning over its tabs as described with reference to Figs. 4 and 5.

From Fig. 11 it will be clear that the shorter length of the aerofoil portions of the rotor blades and the greater depth of the recess 1 below the blade roots of the higher pressure turbine stages allows the dropping of the blades down to the bottom of the recess from where firstly the two ordinary blades having the roots 6 can be pulled up through the window 14 and then shifted circumferentially along the circumferentially extending ledges 13 into position and lastly the locking blade having the root 8 is pulled in position, the said window being always placed in a position adjacent the root 7 of the blade adapted to match the locking blade.

Instead of adapting the root 7 of the blade on the right hand side of the locking blade only, the roots of the blades on both sides of the latter can be so adapted, if desired.

What has been described hereinabove for the rotor of an axial flow gas turbine applies likewise to the rotor of an axial flow compressor, Figs. 7 to 10 then applying to low pressure stages, and Fig. 11 to a high pressure stage of such a compressor.

What I claim as my invention and desire to secure by Letters Patent is:

A rotor of an axial flow elastic fluid machine having a circumferentially extending recess therein and having axially spaced circumferentially extending ledges overlying said recess thus providing a gap between said ledges, blades each having an airfoil portion and a root portion of greater axial than circumferential dimension, lateral projections on said root portion extending under and bearing on said ledges from within said recess under operational centrifugal loading of said blades in their normal operative positions, the width of said gap being sufficient for inserting said blades when turned 90° about the radial blade-axis from the operative position, said recess being of a depth sufficient to receive said root portion and part of said airfoil portion, and of a width sufficient to allow each said blades to be turned 90° about the radial axis thereof into the operative position of said blade, each of said blades having a platform having circumferential shoulders to rest on the outer side of said ledges, a window provided by slots in said ledges to allow said platforms to move radially outwardly between said ledges after said blades have been turned in said recess into the normal operative position, and to move circumferentially along said ledges into the final operative position, one of said blades being a locking blade having secured on at least one side of the root portion thereof, a filler member fitting into the space provided by said slot in said ledge, said filler member having a radially extending portion, which when bent at right angles to said root portion over said rotor, supports said locking blade circumferentially and radially of said rotor.

References Cited in the file of this patent
UNITED STATES PATENTS

| | | |
|---|---|---|
| 868,419 | Emmet | Oct. 15, 1907 |
| 883,932 | Callan | Apr. 7, 1908 |
| 1,156,529 | Hillner | Oct. 12, 1915 |
| 1,371,327 | Schneider | Mar. 15, 1921 |
| 1,967,962 | Metten | July 24, 1934 |
| 2,393,447 | Allen | Jan. 22, 1946 |
| 2,398,140 | Heppner | Apr. 9, 1946 |

FOREIGN PATENTS

| | | |
|---|---|---|
| 6,822 | Great Britain | A.D. 1907 |
| 258,967 | Italy | Jan. 11, 1928 |
| 265,292 | Switzerland | Feb. 16, 1950 |